United States Patent [19]

Clair

[11] Patent Number: 5,269,916

[45] Date of Patent: Dec. 14, 1993

[54] PIPE PROTECTOR/FLUID IONIZER EMPLOYING MAGNETIC CONDENSER FOR PRODUCING CONCENTRATED FORCE LINES PERPENDICULAR TO FLUID FLOW

[76] Inventor: Colonel Clair, P.O. Box 94321, Las Vegas, Nev. 89119

[21] Appl. No.: 943,712

[22] Filed: Sep. 11, 1992

[51] Int. Cl.⁵ ............................................. C02F 1/48
[52] U.S. Cl. .................................... 210/222; 335/304
[58] Field of Search ............... 210/222; 335/302, 304, 335/306

[56] References Cited

U.S. PATENT DOCUMENTS

| | | | |
|---|---|---|---|
| 2,652,925 | 9/1953 | Vermeiren | 210/222 |
| 3,214,086 | 10/1965 | Matricon | 335/306 |
| 3,349,354 | 10/1967 | Miyata | 335/209 |
| 4,188,296 | 2/1980 | Fujita | 210/222 |
| 4,210,535 | 7/1980 | Risk | 210/222 |
| 4,265,746 | 5/1981 | Zimmerman, Sr. et al. | 210/695 |
| 4,265,754 | 5/1981 | Menold | 210/222 |
| 4,265,755 | 5/1981 | Zimmerman | 210/222 |
| 4,367,143 | 1/1983 | Carpenter | 210/222 |
| 4,711,271 | 12/1987 | Weisenbarger et al. | 210/222 |
| 5,055,189 | 10/1991 | Ito | 210/222 |
| 5,186,827 | 2/1993 | Liberti et al. | 210/222 |
| 5,227,683 | 7/1993 | Clair | 310/11 |

FOREIGN PATENT DOCUMENTS

WO81/02529 9/1981 PCT Int'l Appl.

Primary Examiner—Matthew O. Savage
Attorney, Agent, or Firm—David Pressman

[57] ABSTRACT

A magnetic pipe protector for protecting the interior of pipes from scaling, corrosion, and algae, comprises a flat, square neodymium iron boron magnet (10) having a concentrator (11) on its lower side for attachment to a steel pipe (14). A partially cylindrical joinder piece (12) is attached to the other side of the magnet. A cylindrical pole piece (15) with a partially cylindrical cut (18) is circumferentially spaced from the concentrator on the pipe. A connector (16) has partially cylindrical grooves (17) near its distal ends for accepting the joinder piece and the pole piece. The pole piece and the joinder piece, and thus the magnet and the concentrator, may be axially rotated within the grooves to allow the pipe protector to fit pipes of various sizes. The pipe protector projects a strong magnetic field into the interior of the pipe, completely perpendicular to the direction of the water flow (F). Water cutting the magnetic field produces an electrical current which charges the pipe negative enough for repelling and preventing scaling, corrosion, and algae.

8 Claims, 1 Drawing Sheet

PIPE PROTECTOR/FLUID IONIZER EMPLOYING MAGNETIC CONDENSER FOR PRODUCING CONCENTRATED FORCE LINES PERPENDICULAR TO FLUID FLOW

BACKGROUND

1. Field of Invention:

This invention relates generally to devices for protecting pipes and for ionizing fluids, specifically to an improved magnetic pipe protection and fluid ionizing device.

2. Prior Art:

Steel pipes which carry water are normally susceptible to scaling, corrosion, and algae. As a result, the pipes become restricted and weakened so that they carry less fluid, leak, and even burst. The underlying cause is known as "pipe charging": Fluids running in pipes create a static interface with the inside pipe wall, charging it positive (Helmholtz, 1879; Gouy-Chapman, 1910-1913).

Calcium carbonate, which is abundant in water, is attracted to the positive pipe. This calcium salt accumulates on the pipe wall to form calcite deposits or scales, which, over time, build up in sufficient amounts to restrict water flow. The positive pipe also attracts the negative oxygen side of the dipolar water molecules, which combine with the pipe's iron to form iron oxide, or rust or corrosion, to weaken the pipe. Furthermore, algae, which is attracted to positively charged surfaces, sticks to the pipe. The algae multiplies and forms a thick slime to protect itself while it digests the pipe. The resulting microbiological corrosion eats through the pipe wall while the growing slime mass reduces the fluid flow. These three effect—scaling, corrosion, and algae growth—lower the flow rate and efficiency of pipes, and may cause the pipes to leak and even burst.

Toxic chemicals, usually acids and expensive biocides, are generally added to the water to prevent or dissolve and remove these materials from the pipes. Although effective, chemicals are an expensive solution because they must be continuously added to the water supply. More importantly, they are harmful to both humans and the environment.

Magnetic devices have been used for preventing scaling, corrosion, and algae growth in pipes. U.S. Pat. Nos. 2,652,925 to Vermeiren (1949), 4,210,535 to Risk (1980), 4,265,746 to Zimmerman, Sr. et. al. (1981), 4,265,754 to Menold (1981), and 4,265,755 to Zimmerman (1981), and International Application PCT/US81/00304 to White Light Industries (1981) show magnetic devices which fit around water pipes. These comprise a plurality of magnets with opposite poles spaced axially along the pipes. These magnets project magnetic fields into nonferrous pipes with flux lines which are generally parallel to the direction of water flow. According to Faraday's law, a conductor—which in this case is the water—cutting magnetic flux lines generates an electrical current in the conductor. However, because no current can be generated by a conductor that moves parallel to the flux lines, these devices could not generate current. This renders them ineffective for charging pipe walls negative to prevent deposits, corrosion, and algaes. Producing a high enough current in the water will generate a current which will charge the pipe sufficiently negative to repel calcium carbonate, water molecules, and algae to prevent scaling, corrosion, and algae growth, respectively.

OBJECTS AND ADVANTAGES

Accordingly, several objects and advantages of the invention are to provide a magnetic pipe protector which produces a magnetic field with flux lines entirely perpendicular to the direction of fluid flow, which charges pipes negative, which causes pipes to repel all negative ions such as carbonates, oxygen, and algaes to protect pipes from deposits, corrosion, and algae growth, respectively, which easily adjusts to fit on pipes of various diameters, which protects steel and nonferrous pipes, which is easy to install and adjust, which is compact, and which is simple and economical to manufacture.

Further objects and advantages will become apparent from a study of the following description and the accompanying drawings.

DRAWING FIGURES

DRAWING REFERENCE NUMERALS

10: Magnet
12: Joinder Piece
14: Pipe
16: Connector
18: Cut
20: Flux Lines
22: Magnet Assembly
24: Connector
11: Concentrator
13: Magnet Assembly
15: Pole Piece
17: Groove
19: Pipe
21: Bevel
23: Concentrator

DESCRIPTION—FIG. 1

Figure 1:
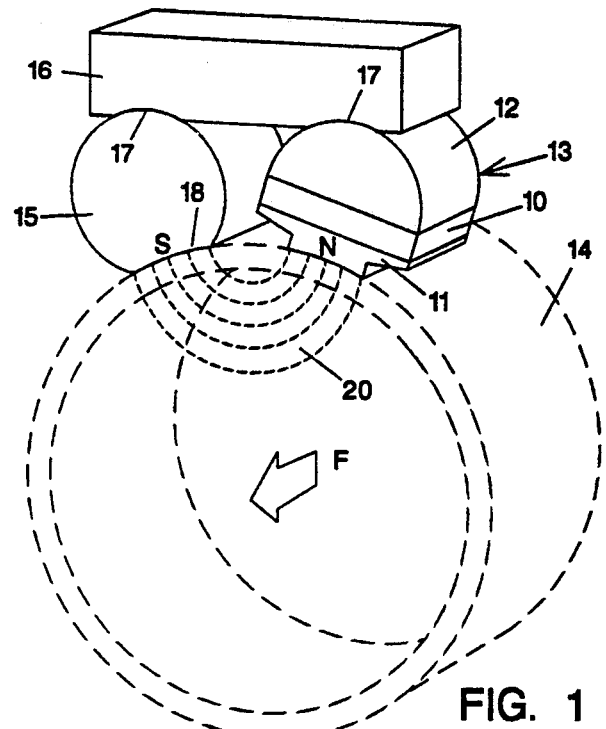
FIG. 1 is a perspective view of a magnetic pipe protector fitted onto a pipe in accordance with a preferred embodiment of the invention.

In accordance with a preferred embodiment of the invention shown in FIG. 1, a magnetic pipe protector comprises a flat, square neodymium iron boron (Nd-Fe-B) magnet 10 having an extremely high flux density of 12,000 gauss. Attached to the lower surface or north pole N of magnet 10 is a magnetically saturated steel concentrator or pole piece 11, the proximal end of which is the same width as the magnet. A sharp taper narrows concentrator 11 to half its initial width at the distal end to increase the flux density. A semi-cylindrical joinder piece 12, having a diameter equal to the width of magnet 10, is attached to the top surface of the magnet. Magnet 10, concentrator 11, and joinder piece 12 form magnet assembly 13, which is magnetically attached to and parallel with a steel (ferrous) pipe 14. The surface of concentrator 11 has a concave distal end, and has a radius equal to that of pipe 14 to maximize surface contact with the pipe. The direction of water flow in pipe 14 is indicated by arrow F.

Circumferentially spaced from magnet assembly 13 on one side of pipe 14 is a cylindrical steel pole piece 15, which has the same diameter as joinder piece 12. On the lower side of pole piece 15 is a longitudinal and concave cut 18, which has the same radius as pipe 14 to maximize surface contact with the pipe. Cut 18 forms the south pole S. The width of cut 18 is equal to the width of the distal end of concentrator 11, while both widths are greater than the thickness of pipe 14.

A rectangular steel connector 16 joins pieces 12 and 15, and has two semi-cylindrical grooves 17 on its lower side, each groove has the same radius as joinder piece 12 and pole piece 15. The width of the cut of each groove is larger than the width of the cuts of concentrator 11 and cut 18 on pole piece 15. Grooves 17 receive joinder piece 12 and pole piece 15 such that they can be axially rotated (adjusted) within the grooves so that the assembly can be fitted onto pipes of various diameters, thereby to maximize the contact area with the pipe.

Figure 2:
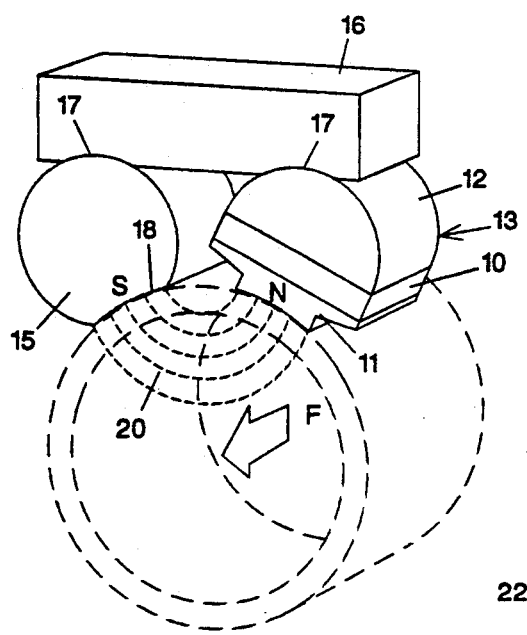
FIG. 2 is a perspective view of the pipe protector of FIG. 1, fitted onto a smaller pipe.
Figure 3:
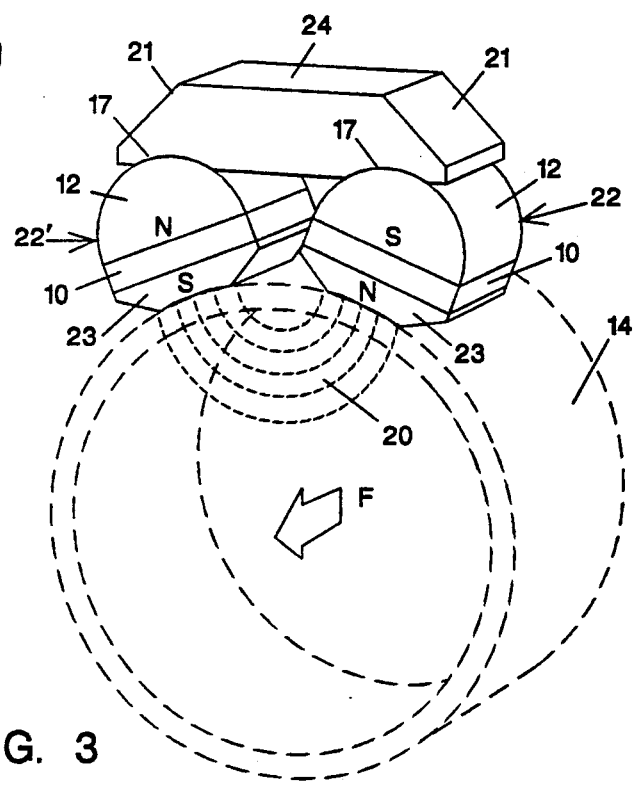
FIG. 3 is a perspective view of the magnetic pipe protector fitted onto a pipe in accordance with another embodiment of the invention.

All parts are held together magnetically such that no adhesives or other fastening means are necessary. The steel parts, which are grade 1018, are nickel, chrome, or ni-cad plated, while the exposed sides of magnet 10 are polymer coated to prevent corrosion. As shown in FIGS. 1 to 3, the surfaces of the magnetic assembly which contact the pipe are the concave distal end of concentrator 11 and concave cut 18 on pole piece 15.

In one embodiment pipe 14 was 15.24 cm in diameter (ID), magnet 10 was 5.08 cm long by 5.08 cm wide and 0.8 cm thick, pieces 12 and 15 had diameters of 5.08 cm, piece 11 was 0.95 cm thick and tapered proportionally as indicated, and pieces 12 and 15 had cutouts of 7.62 cm radii to fit onto pipe 14.

DESCRIPTION—FIG. 2

Here the magnetic pipe protector is attached to a smaller steel pipe 19. Magnet assembly 13 and pole piece 15 are axially rotated within grooves 17 slightly towards each other, such that cut 18 and the distal end of concentrator 11 are generally parallel to the surface of pipe 14 to maximize surface contact with the pipe. Direction of water flow F is indicated by the arrow.

DESCRIPTION—FIG. 3

In accordance with another embodiment of the invention shown in FIG. 3, two magnet assemblies 22 and 22' are attached to the upper right and left, respectively, of pipe 14. Magnet 10, joinder piece 12, and concentrator 23 form magnet assemblies 22 and 22'. Concentrator 23 is similar to concentrator 11, except that it tapers smoothly between the proximal and distal ends. A rectangular connector 24 has two semi-cylindrical cuts 17 on its lower side for receiving joinder pieces 12 of magnet assemblies 22 and 22'. Connector 24 has large bevels 21 on its upper corners to save steel and space. Magnet assembly 22 has a magnet 10 which is oriented with its south pole S upwardly and its north pole N downwardly, while magnet assembly 22' has a magnet 10 which is oriented the opposite way.

OPERATION—FIGS. 1 TO 3

In the preferred embodiment of the pipe protector shown in FIGS. 1 and 2, magnet assembly 13, connector 16, and pole piece 15 roughly form a "horseshoe" magnet which has a north pole N at the distal end of concentrator 11 and a south pole S at cut 18 of pole piece 15. The width of the distal end of concentrator 11 is wider than the thickness of pipe 14, and concentrator 11 is magnetically saturated to an amount equal to or greater than the magnetic permeability of the pipe wall. As a result, the surplus flux from concentrator 11 bursts through the pipe wall and projects some distance into the pipe's interior as flux lines 20 which are in a curved path as indicated over to south pole S. The close proximity of magnet 10 to the distal end of concentrator 11 maximizes the intensity of the magnetic field.

Because all lengths of flux lines 20 are completely perpendicular to the direction of water flow F, they are always cut by the moving water at the maximum, and thus the most efficient, angle to generate the maximum electrical current possible. Therefore, a relatively strong electrical current flows between the water and pipe 14 to charge pipe 14 (and pipe 19) sufficiently negative. Pipe 19 (FIG. 2) is affected similarly to pipe 14 in all instances.

The negatively charged pipe 14 repels all negative ions such as carbonates and oxygen. Therefore, deposits and corrosion are prevented. Furthermore, the negatively charged pipe 14 repels algae, which needs a positively charged surface to attach to. As a result, pipe 14 is kept clean to maintain its flow capacity and structural strength. If pipe 14 is already encrusted with scaling, corrosion, and algae, the magnetic pipe protector can rid the pipe of these harmful materials. The negatively charged pipe 14 causes the positive hydrogen in water to combine with the negative calcite deposits to dissolve the deposits into calcium bicarbonate and water, which are carried away by the water stream. Therefore, scaling is removed and further deposits are prevented. Negatively charged pipe 14 also causes the positive hydrogen in the water to combine with iron oxide or rust to dissolve the corrosion into water and iron, which are carried away by the water stream. Furthermore, the positively charged water and negatively charged pipe 14 interfere with algae cell division, which prevents any attached algae from maintaining its slime layer and from continuing its growth. Therefore, the algae quickly dies and is carried away by the water stream, while further algae attachment or growth is repelled and prevented by the negative pipe.

In the alternative embodiment of the pipe protector shown in FIG. 3, two magnet assemblies 22 and 22' are attached to pipe 14. The north pole N of magnet assembly 22 is in contact with pipe 14, while the south pole S of assembly 22' is in contact with the pipe. While the two magnets 10 will not combine in strength, they will compensate for any flux leakage in the magnetic current so as to cause a stronger magnetic field with flux lines 20 to be projected into pipe 14 between the opposite poles. Water running through flux lines 20 will create a stronger electrical current to charge pipe 14 more negatively than in FIGS. 1 and 2, such that negative ions and algaes are more effectively repelled. This can be especially useful for treating and maintaining pipes which carry water with especially high concentrations of ions and algaes.

The small size of the magnetic pipe protector allows multiple units to be placed circumferentially around the same section of a pipe to provide maximum protection.

SUMMARY, RAMIFICATIONS, AND SCOPE

Accordingly the reader will see that I have provided an improved magnetic pipe protector for protecting all fluid carrying pipes, including but not limited to cooling, heating, culinary, laundry, irrigation, swimming pool, fountain and potable water pipe, as well as crude oil, natural gas, gasoline, diesel and fuel oil pipes. It may be used to project a magnetic field into the stream of water within a pipe, such that the water cuts through all the flux lines perpendicularly for most efficiently charging the pipe negative. It may be used to prevent scale, corrosion, parafinning, and algae growth in fluid carrying pipes. It may be used to dissolve and remove calcite scaling, rust, and algae in damaged pipes to clear the pipes and prevent further damage. It may be used to provide more effective and economical cathodic protection to cross-country water, natural gas, and petroleum pipelines. It eliminates the recurring cost and need for conventional pipe treatments with expensive toxic chemicals. It uses only one magnet to achieve very high efficiency. It is highly compact, such that multiple units may be fitted around the same section of a pipe for even greater effectiveness. It is magnetically and therefore easily installed onto steel pipes, while it may be easily adjusted to fit pipes of various diameters. It may be used to protect non-ferrous pipes. Furthermore, it is simple and economical to manufacture.

While the above descriptions are specific, they should not be considered as limitations on the scope of the invention, but only as examples of the preferred embodiment. Many other ramifications and variations are possible within the teachings of the invention. For example, a different type of permanent magnet, or an electromagnet, may be used. The parts may be shaped differently, for example, the permanent magnet may be rectangular in shape. The distal ends of concentrator 11 and pole piece 15—the areas which contact pipe 14 (and pipe 19)—may be reduced to long and narrow edges, or may have the radii of their cutouts adjusted to conform precisely to specific pipe sizes. Magnet assembly 13 and pole piece 15 may be adjustable by other means, or they may be fixed in position. The magnetic pipe protector may be covered with a housing. The pipe protector may be strapped or otherwise fastened onto non-ferrous pipes to protect those pipes.

Thus the reader is requested to determine the scope of the invention by the appended claims and their legal equivalents, and not by the examples given.

I claim:

1. A magnetic pipe protector intended for use upon a pipe and for protecting said pipe from harmful effects, said pipe being of the type that is made of magnetically permeable material, has a longitudinal axis, a convex curved outer surface, and an interior lumen, said magnetic pipe protector comprising:

(a) a magnet having a pair of pole surfaces of opposite polarity, said pole surfaces having a predetermined area, and (b) a pole piece concentrator made of magnetically permeable material, said pole piece concentrator having a pair of oppositely facing surfaces, one of said oppositely facing surfaces being a proximal surface which abuts one of said pole surfaces of said magnet and the other of said oppositely facing surfaces being a distal surface which is distal to said magnet, said proximal surface being magnetically coupled to said one of said pole surfaces of said magnet and having an area equal to said predetermined area of said one pole surface of said magnet, said distal surface being concave and curved to conformingly mate with said convex curved outer surface of said pipe, when said distal surface is placed upon said pipe, said distal surface having an area smaller than said predetermined area so that said pole piece concentrator will concentrate and thus increase the magnetic flux density from the value present at said one pole surface of said magnet, (c) a joinder piece attached to the other pole surface of said magnet, said joinder piece being made of magnetically permeable material.

(d) a connector piece attached to said joinder piece, said connector piece being made of magnetically permeable material, (e) a pole piece having a pair of oppositely facing surfaces, one of which is attached to said joinder piece, said pole piece being magnetically coupled to said other pole surface of said magnet via said connector piece and said joinder piece, said distal surface being concave and curved to conformingly mate with said convex curved outer surface of said pipe, when said distal surface is placed upon said pipe, said pole piece being made of magnetically permeable material, (f) said pole piece concentrator, said magnet, said joinder piece, said connector piece, and said pole piece all being held together magnetically to form an assembly, said assembly being held to said pipe magnetically when said distal surfaces of said pole piece and said pole piece concentrator of said assembly are positioned upon said pipe, (g) said pole piece concentrator, said magnet, said joinder piece, said connector piece, and said pole piece being shaped and sized so that when said distal surfaces of said pole piece concentrator and said pole piece of said assembly are positioned upon said convex curved outer surface of said pipe, said distal surface of said pole piece concentrator and said joinder piece will be circumferentially spaced on one side of said convex curved outer surface of said pipe, (h) said pole piece concentrator, said magnet, said joinder piece, said connector piece, and said pole piece, being connected so that when said distal surfaces of said pole piece concentrator and said pole piece of said assembly are positioned upon said convex curved outer surface of said pipe, said pole piece concentrator, said magnet, said joinder piece, said connector piece, and said pole piece, will form a closed, continuous, gapless assembly so that magnetic flux will travel from said magnet's pole surfaces, through said pole piece concentrator, and through said joinder piece, said connector, said pole piece, and said wall of said pipe, (i) said magnet being strong enough so that, when said distal surfaces of said pole piece concentrator and said pole piece of said assembly are positioned upon said pipe, some of said magnetic flux in said concentrator will travel within said interior lumen of said pipe in a curved arc which is substantially perpendicular to said axis of said pipe, (j) whereby, when said distal surfaces of said pole piece concentrator and said pole piece of said assembly are positioned upon said pipe, any fluid flowing within said lumen of said pipe will cut said magnetic flux in said lumen at a substantially right angle so as to generate maximum electrical current.

2. The magnetic pipe protector of claim 1 wherein said magnet is a permanent magnet.

3. The magnetic pipe protector of claim 2 wherein said permanent magnet is a neodymium iron boron magnet.

4. The magnetic pipe protector of claim 2 wherein said permanent magnet is rectangular.

5. The magnetic pipe protector of claim 5 wherein said permanent magnet has a flux density of about 12,000 gauss.

6. The magnetic pipe protector of claim 1 wherein
said magnet is a rectangular member, said pole surfaces of said magnet being planar, said pole piece concentrator being connected directly to one of said pole surfaces of said magnet,
said joinder piece has a pair of opposite surfaces, one of which is planar and the other of which has a convex curvature, said planar surface of said joinder piece attached to said other of said pole surfaces of said magnet, and
said connector piece comprises an elongated member having a pair of curved grooves at opposite ends thereof, one of said curved grooves being mated with said other, convex curved surface of said joinder piece, the other of said curved grooves being mated with a surface of said pole piece.

7. The magnetic pipe protector of claim 1, wherein said joinder piece and said pole piece include convex surfaces, and wherein said connector piece includes a pair of cylindrical grooves for receiving said convex surfaces of said joinder piece and said pole piece, whereby said joinder piece and said pole piece may be rotated axially within said cylindrical grooves of said connector for fitting said magnetic pipe protector onto pipes of various diameters.

8. The magnetic pipe protector of claim 1, wherein said pole piece includes a second magnet, a second joinder piece, and a second pole piece concentrator configured and arranged in a manner identical to that of the first mentioned magnet, joinder piece, and pole piece concentrator.

* * * * *

UNITED STATES PATENT AND TRADEMARK OFFICE
CERTIFICATE OF CORRECTION

PATENT NO. : 5,269,916

DATED : December 14, 1993

INVENTOR(S) : Colonel Clair

It is certified that error appears in the above-indentified patent and that said Letters Patent is hereby corrected as shown below:

Column 3, line 12, change "side, each" to --side. Each --.

Signed and Sealed this

Third Day of May, 1994

Attest:

BRUCE LEHMAN

Attesting Officer

Commissioner of Patents and Trademarks